United States Patent Office 2,824,144
Patented Feb. 18, 1958

2,824,144

PROCESS FOR THE PREPARATION OF ω-BROMO-STYRENE AND 4-METHYL-ω-BROMOSTYRENE

Muus Gerrit Jan Beets and Emanuel Alexander Drukker, Hilversum, Netherlands, assignors to N. V. Polak & Schwarz's Essencefabrieken, Hilversum, Netherlands, a limited-liability company under Netherlands laws No Drawing. Application May 26, 1953
Serial No. 357,925

Claims priority, application Netherlands May 31, 1952

7 Claims. (Cl. 260—651)

The present invention relates to a novel process for the preparation of ω-bromostyrene or homologues thereof.

ω-Bromostyrene (I) is extensively applied in the perfumery industry since it strongly smells of hyacinths and has a greater stability in respect of alkali than has phenyl acetaldehyde and therefore can better be worked into soap than the said aldehyde.

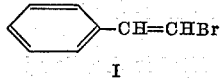

I

In the literature only one single method is described for the preparation of this perfume. Bromine is added to the double bond of cinnamic acid and the cinnamic acid dibromide so obtained is treated with alkali at elevated temperatures due to which decarboxylation as well as withdrawal of hydrobromic acid occurs:

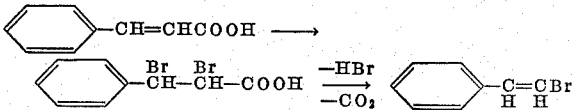

A. Lewinsohn (Perf. and Ess. Oil Rec. 15 (1924), 118) carries out the addition of bromine in ether, whereupon the solvent is removed and the cinnamic acid dibromide is decomposed to bromostyrene by steam distillation in the presence of sodium carbonate.

According to J. K. Farrell and G. Bryant Bachmann (J. Am. Chem. Soc. 57 (1935), 1281) it is also possible to carry out the decomposition in the presence of pyridine.

Other variations of the same method are described by P. P. Shoruigin, V. I. Isagulyantz and A. R. Guseva (Chem. Abstr. 26 (1932), 2441); I. Herold (Deutsche Parf. Zng. 17 (1931), 246); C. Dufraisse (Ann. Chim. [9] 17 (1922), 198) and by G. Chazel (Rev. Prod. Chim. 22 (1919), 1781).

This method, however, is commercially not attractive because it starts from the rather expensive raw material cinnamic acid.

The present invention makes it possible to prepare bromostyrene and homologues thereof in good yield from a cheap raw material, namely styrene or homologues thereof.

It is known from the U. S. P. 2,237,284 that styrene can be converted in a simple manner into styrene bromohydrin according to the reaction equation:

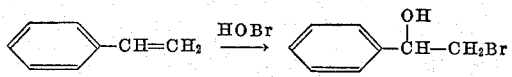

According to the present invention styrene bromohydrin or homologues thereof, can be converted in a simple manner into ω-bromostyrene or homologues thereof by withdrawal of one mol of water:

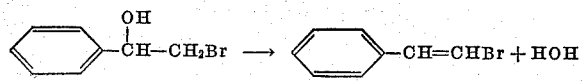

For this purpose styrene bromohydrin is treated with a suitable non-alkaline dehydrating agent which may be a dehydrating catalyst.

As a particularly suitable dehydrating agent potassium hydrogen sulphate ($KHSO_4$) can be mentioned, but others are also suitable for this purpose, such as sulphuric acid, phosphoric acid, phosphorus pentoxide, $Al_2O_3$, $ThO_2$, etc. All of these agents are non-alkaline.

In general it is not necessary to have these agents participate in the reaction in a stoichiometric quantity, generally a much smaller quantity is sufficient.

The treatment takes place by heating at a temperature and during a time which depend on the dehydrating catalyst applied.

It has appeared to be particularly advantageous to distill off the ω-bromostyrene formed during the reaction simultaneously with the course of the reaction and together with the water formed, preferably under reduced pressure. This has the result that the reaction product is in time withdrawn from the polymerising action of the generally acid catalyst.

The same purpose can be achieved by carrying out the reaction continuously, in other words by passing styrene bromohydrin through a tube furnace filled with the dehydrating catalyst, it being possible in a high degree to control the course of the reaction by control of the time of contact of raw material and reaction product with the catalyst and of the temperature. It is possible, and even advantageous, to use instead of pure styrene bromohydrin the technical product contaminated with styrene dibromide, as obtained according to the U. S. P. 2,237,284.

The invention is further elucidated by the following examples:

EXAMPLE I

Into a vacuum distillation apparatus without fractionating column are brought: 402 g. of pure styrene bromohydrin (2 mols) and 100 g. of phosphorus pentoxide.

The temperature of the mixture spontaneously rises to approximately 100° C. A vacuum of 15 mm. is applied and one distils in 10–15 minutes to a distillation temperature of approximately 215° C.

The distillate is washed with water for the removal of traces of acid and fractionated in vacuo at a suitable column.

The yield amounts to 47–49% of the theoretical. $n_D^{20}$: 1.6077. Solidification point: +2.2° C. B. P. 4 mm. 73–74° C.

EXAMPLE II

Into a distillation apparatus are brought: 402 g. of styrene bromohydrin, purified (2 mols), 96.5 g. of potassium hydrogen sulphate and a trace of hydroquinone.

A vacuum of 15 mm. is applied and one distils in 20 minutes to a distillation temperature of 205° C. The distillate (369 g.) is washed free of acid with water and fractionated in vacuo. The yield amounts to approximately 57% of the theoretical.

B. P. 4 mm. 73–74° C. $n_D^{20}$: 1.6065.

EXAMPLE III

Into a distillation apparatus are brought: 402 g. of pure styrene bromohydrin (2 mols), 40 g. of phosphoric acid of 85% and a little hydroquinone.

A vacuum of 15 mm. is applied and one distils in 15 minutes to a distillation temperature of 210° C.

One washes with water to remove traces of acid and fractionates in vacuo in a suitable apparatus.

$n_D^{20}$: 1.6069. Yield approximately 40% of the theoretical.

EXAMPLE IV 18.72 kg. of styrene are converted into 35 kg. of technical styrene bromohydrin.

28.7 kg. thereof are converted with 7.13 kg. of potassium hydrogen sulphate according to Example III. After separation of the water formed and washing to neutral reaction 23.5 kg. of distillate are obtained. One distils in vacuo and approximately 14 kg. of pure bromostyrene or 51–52% of the theoretical are obtained, calculated on styrene.

EXAMPLE V

Methyl-4-ω-bromostyrene 309 g. of methyl-4 styrene are converted with 1300 g. of water and 420 g. of bromine into crude 4-methyl styrene bromohydrin.

352 g. of this crude reaction product are distilled at approximately 15 mm. with 90 g. of acid potassium sulphate and a trace of hydroquinone to approximately 210° C. in the vapor.

The distillate is separated from the water layer and fractionated. 204 g. of crystallized 4-methyl-ω-bromostyrene which by recrystallisation from alcohol can be further purified, are obtained.

While crystals with melting point 46.1–46.3° C. and a strong aniselike smell.

What is claimed is:

1. A process for the preparation of a compound selected from the group consisting of ω-bromostyrene and 4-methyl-ω-bromostyrene, comprising the steps of treating a compound correspondingly selected from the group consisting of styrene bromohydrin and 4-methyl-styrene bromohydrin with a non-alkaline dehydrating agent at temperatures of at least 100° C., continuing the treatment under high vacuum and distilling at a temperature of at least about 205° C. to withdraw one mol of water from said treated compound.

2. A continuous process for the preparation of a compound selected from the group consisting of ω-bromostyrene and 4-methyl-ω-bromostyrene, comprising the steps of continuously feeding a compound selected from the group consisting of styrene bromohydrin and 4-methyl styrene bromohydrin to a treatment zone containing a non-alkaline dehydrating agent, treating said latter compound with the dehydrating agent at temperatures of at least 100° C., continuing the treatment under high vacuum, distilling at a temperature of at least about 205° C. to withdraw one mol of water from said treated compound, the prepared compound with the water formed therewith being distilled as they are formed in the reaction, and continuously feeding additional amounts of the second-named compound to the treatment zone to maintain the reaction.

3. The process of claim 1, wherein the dehydrating agent is a dehydrating catalyst.

4. The process of claim 1, wherein the dehydrating agent is potassium hydrogen sulfate ($KHSO_4$).

5. The process of claim 2, wherein the dehydrating agent is a dehydrating catalyst.

6. The process of claim 5, wherein the distillation is performed under reduced pressure.

7. The process of claim 1, wherein the styrene bromohydrin-1-2 contains impurities.

References Cited in the file of this patent

FOREIGN PATENTS 564,828     Great Britain _____ Oct. 16, 1944